(12) United States Patent
Chu

(10) Patent No.: US 10,706,307 B2
(45) Date of Patent: Jul. 7, 2020

(54) METHODS AND DEVICES FOR PROCESSING FINGERPRINT INFORMATION

(71) Applicant: BEIJING XIAOMI MOBILE SOFTWARE CO., LTD., Beijing (CN)

(72) Inventor: Yueyue Chu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 94 days.

(21) Appl. No.: 16/110,413

(22) Filed: Aug. 23, 2018

(65) Prior Publication Data

US 2019/0065876 A1 Feb. 28, 2019

(30) Foreign Application Priority Data

Aug. 25, 2017 (CN) .......................... 2017 1 0744659

(51) Int. Cl.
| | |
|---|---|
| *G06K 9/20* | (2006.01) |
| *G06K 9/00* | (2006.01) |
| *G06F 21/32* | (2013.01) |
| *G06F 21/45* | (2013.01) |
| G06F 3/0484 | (2013.01) |
| G06F 3/0488 | (2013.01) |

(52) U.S. Cl.
CPC ......... *G06K 9/00926* (2013.01); *G06F 21/32* (2013.01); *G06F 21/45* (2013.01); *G06K 9/0004* (2013.01); *G06K 9/00013* (2013.01); *G06K 9/00335* (2013.01); *G06F 3/0484* (2013.01); *G06F 3/04883* (2013.01); *G06F 2221/2143* (2013.01)

(58) Field of Classification Search
CPC ................................... G06K 9/00006–9/0012
See application file for complete search history.

(56) References Cited

U.S. PATENT DOCUMENTS

2010/0265204 A1 10/2010 Tsuda

FOREIGN PATENT DOCUMENTS

| | | |
|---|---|---|
| CN | 104077518 A | 10/2014 |
| CN | 104420725 A | 3/2015 |
| CN | 104573631 | 4/2015 |
| WO | 2015053573 A1 | 4/2015 |
| WO | 2018048212 A1 | 3/2018 |

OTHER PUBLICATIONS

First office action and search report issued in corresponding in Chinese Application No. 201710744659.1, dated Apr. 30, 2019, 15 pages.
Extended European Search Report issued in corresponding European Application No. 18190757.7, dated Jan. 15, 2019, 8 pages.
Third Office Action issued in Chinese Patent Application No. 201710744659.1, dated Mar. 13, 2020 with English translation, (12p).

*Primary Examiner* — Brian Werner
(74) *Attorney, Agent, or Firm* — Arch & Lake LLP

(57) ABSTRACT

A method of processing fingerprint information is provided. According to an example, the method may include: receiving fingerprint information in response to a fingerprint input operation of a user, where the fingerprint information is configured to trigger a terminal to execute a first application; and outputting fingerprint erasure prompt information when it is determined that the execution of the first application is finished, where the fingerprint erasure prompt information is configured to prompt the user to erase a fingerprint impression corresponding to the fingerprint information.

17 Claims, 8 Drawing Sheets

210  220

METHODS AND DEVICES FOR PROCESSING FINGERPRINT INFORMATION

CROSS REFERENCE TO RELATED APPLICATIONS

This application claims priority to Chinese Patent Application No. 201710744659.1 filed on Aug. 25, 2017, the entire content of which is incorporated herein by reference.

TECHNICAL FIELD

The present disclosure relates to the field of communication technology, and in particular to processing fingerprint information.

BACKGROUND

With the continuous development of communication technology, categories of applications are becoming more diverse, and different applications are also being used more widely. To ensure the security of applications, when one application is opened, it is often required to perform a security authentication designated for the application. For example, a fingerprint authentication may be required to process a payment in a shopping application. When the fingerprint authentication is performed, a user is generally required to input a fingerprint and then, the application compares the input fingerprint with a pre-stored fingerprint to complete the authentication. However, if the user does not erase the input fingerprint in time after inputting the fingerprint, the fingerprint may be leaked.

SUMMARY

The present disclosure provides a method and a device for processing fingerprint information.

According to a first aspect of the present disclosure, there is provided a method of processing fingerprint information. The method may include receiving by a terminal fingerprint information in response to a fingerprint input operation of a user, where the fingerprint information is configured to trigger the terminal to execute a first application; and outputting fingerprint erasure prompt information when determining that the execution of the first application is finished, where the fingerprint erasure prompt information is configured to prompt the user to erase a fingerprint impression corresponding to the fingerprint information.

According to a second aspect of the present disclosure, there is provided a device for processing fingerprint information applied to a terminal. The device may include a processor; and a memory for storing instructions executable by the processor; where by executing the processor executable instructions, the processor is configured to receive fingerprint information in response to a fingerprint input operation of a user, where the fingerprint information is configured to trigger a terminal to execute a first application; and output fingerprint erasure prompt information when determining that the execution of the first application is finished, where the fingerprint erasure prompt information is configured to prompt the user to erase a fingerprint impression corresponding to the fingerprint information.

According to a third aspect of the present disclosure, there is provided a non-transitory computer readable storage medium storing computer instructions, where the instructions are executed by a processor to achieve blocks for performing the above method of processing fingerprint information according to the first aspect of the present disclosure.

It is to be understood that the above general description and the below detailed description are merely exemplary and explanatory, and are not intended to limit the present disclosure.

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

BRIEF DESCRIPTION OF DRAWINGS

Accompanying drawings herein incorporated in the specification to form a part of the specification, illustrate examples consistent with the present disclosure, and serve to explain the principle of the present disclosure together with the specification.

Figure 1:
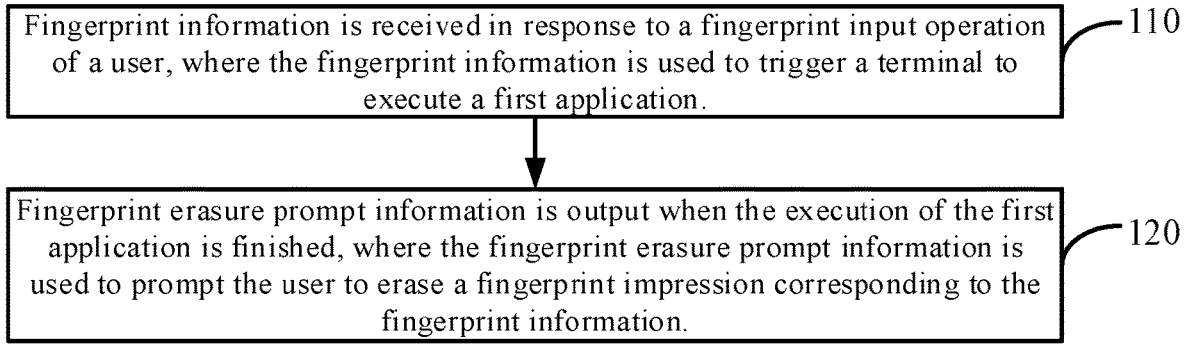
FIG. 1 is a flowchart illustrating a method of processing fingerprint information according to an example of the present disclosure.

The above drawings and the following descriptions are only examples of the present disclosure. For those skilled in the art, other drawings may be obtained according to these drawings without creative effort.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

The term used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to."

Figure 2A:
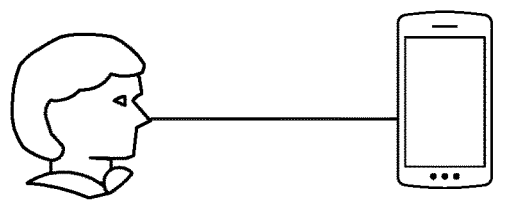
FIG. 2A is a schematic diagram illustrating an application scenario of a method of processing fingerprint information according to an example of the present disclosure.

FIG. 1 is a flowchart illustrating a method of processing fingerprint information according to an example of the present disclosure. FIG. 2A is a schematic diagram illustrating an application scenario of a method of processing fingerprint information according to an example of the present disclosure. The method of processing fingerprint information may be applied to a terminal. As shown in FIG. 1, the method of processing fingerprint information may include the following blocks 110 to 120.

At block 110, fingerprint information is received in response to a fingerprint input operation of a user, where the fingerprint information is configured to trigger a terminal to execute a first application (APP).

The terminal in the present disclosure may be any intelligent terminal with an Internet accessing function, such as a mobile phone, a tablet computer, and a Personal Digital Assistant (PDA). The terminal may access a router via a wireless local area network, and may access a server on a public network via the router.

In the present disclosure, the first application may be an application in which a fingerprint recognition function is used, such as an application relating to operations of paying, authorizing, opening a private file, unlocking a terminal and the like.

Figure 2B:
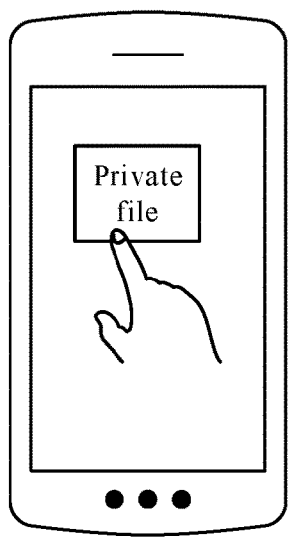
FIG. 2B is a schematic diagram illustrating a method of processing fingerprint information according to an example of the present disclosure.
Figure 2C:
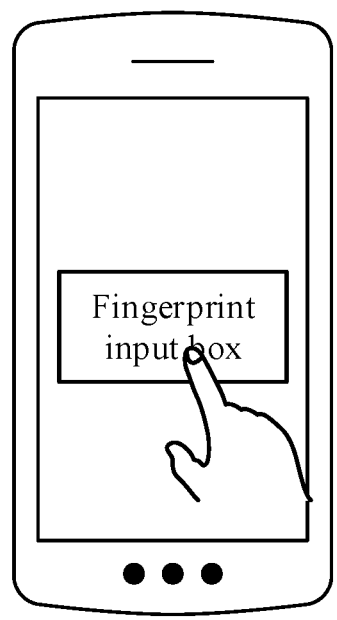
FIG. 2C is a schematic diagram illustrating a method of processing fingerprint information according to another example of the present disclosure.

When the terminal executes the first application, a user is required to input fingerprint information. As shown in FIG. 2B and FIG. 2C, when the user opens a private file on a smart phone, a fingerprint input box may be displayed on the smart phone, and the user may input his/her fingerprint information in the fingerprint input box.

At block 120, fingerprint erasure prompt information is output when it is determined that the execution of the first application is finished, where the fingerprint erasure prompt information is configured to prompt the user to erase a fingerprint impression corresponding to the fingerprint information.

Figure 2D:
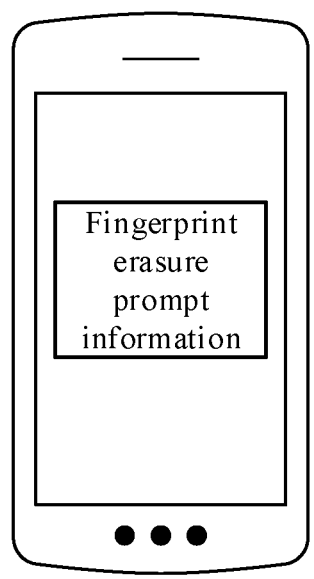
FIG. 2D is a schematic diagram illustrating a method of processing fingerprint information according to still another example of the present disclosure.

In the present disclosure, fingerprint erasure prompt information is configured to prompt a user to erase a fingerprint impression. For example, the fingerprint erasure prompt information may be displayed in a text form, as shown in FIG. 2D; and/or the fingerprint erasure prompt information may be played in a voice form. The form of the fingerprint erasure prompt information is not specifically limited in the present disclosure.

As shown in FIG. 2A, an exemplary scenario includes a user 210 and a smart phone 220 as a terminal. When the user 210 needs to have a first application executed on the smart phone 220, the user may input his/her fingerprint information. The smart phone 220 may execute the first application based on the fingerprint information input through the fingerprint input operation. When determining that the execution of the first application is finished, the smart phone 220 may output fingerprint erasure prompt information, where the fingerprint erasure prompt information may be configured to prompt the user 210 to erase a fingerprint impression corresponding to the fingerprint information.

It may be seen from the above example that after executing the first application in response to the fingerprint information input through the fingerprint input operation, the terminal may output the fingerprint erasure prompt information to prompt the user to erase the fingerprint impression corresponding to the fingerprint information when determining that the execution of the first application is finished, so that the user may erase the fingerprint impression in time based on the fingerprint erasure prompt information, thereby avoiding the leakage of the fingerprint information and improving the security of the fingerprint information.

In an example, at the above block 120, the fingerprint erasure prompt information may be output for example, by displaying a fingerprint erasure prompt interface. The fingerprint erasure prompt interface may include the fingerprint erasure prompt information.

It may be seen from the above example that the user may directly obtain the fingerprint erasure prompt information from the fingerprint erasure prompt interface by displaying the fingerprint erasure prompt interface including the fingerprint erasure prompt information, thereby facilitating erasure of fingerprint information.

Figure 3A:
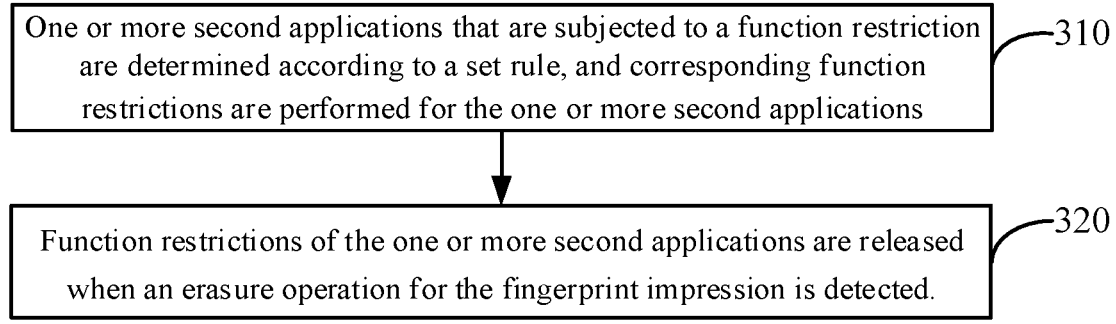
FIG. 3A is a flowchart illustrating a method of processing fingerprint information according to another example of the present disclosure.

FIG. 3A is a flowchart illustrating a method of processing fingerprint information according to another example of the present disclosure. The method of processing fingerprint information may be applied to a terminal. As shown in FIG. 3A, based on the method shown in FIG. 1, the method of processing fingerprint information may also include the following blocks 310 to 320.

At block 310, one or more second applications that are subjected to a function restriction are determined according to a set rule, and corresponding function restrictions are performed for the one or more second applications.

In the present disclosure, after the terminal outputs the fingerprint erasure prompt information and before it is detected that the user completes the erasure of the fingerprint impression, some applications corresponding to important functions of the terminal (such as a phone call, a short message) may be restricted, or all applications may be restricted (i.e., other applications may be executed only after the fingerprint impression is erased), or only an erasure prompt is given without restricting any application. Therefore, the one or more second applications determined according to the set rule may correspond to some functions of the terminal, or all functions of the terminal.

At block 320, the function restrictions of the one or more second applications are released when an erasure operation for the fingerprint impression is detected.

Figure 3B:
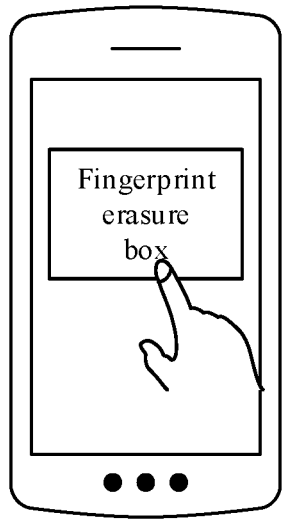
FIG. 3B is another schematic diagram illustrating a method of processing fingerprint information according to another example of the present disclosure.

In the present disclosure, the terminal outputs the fingerprint erasure prompt information, and the user may erase the fingerprint impression to prevent leakage of his/her fingerprint information after obtaining the fingerprint erasure prompt information. As shown in FIG. 3B, after the terminal outputs the fingerprint erasure prompt information, a fingerprint erasure box may be displayed, and the user may perform an erasure operation in the fingerprint erasure box. For example, the user may slide his/her finger on the fingerprint erasure box back and forth several times. In addition, as will be described below with reference to FIG. 4B, the user may slide his finger on the fingerprint erasure box along a specific trajectory. Additionally or alternatively, the user may use other tools for erasing the fingerprint marks on the screen while the terminal may detect whether the user performed the erasing acts in the fingerprint erasure box. The fingerprint erasure box may be displayed to highlight the fingerprint marks on the touch screen, for example, the fingerprint erasure box may include a color that is different from the background color of the other parts of the touch screen.

It may be seen from the above example that after the one or more second applications that are subjected to a function restriction are determined according to the set rule and corresponding function restrictions are performed for the one or more second applications, when the erasure operation for the fingerprint impression is detected, the function restrictions of the one or more second applications may be released, so that the user may be prompted to erase the fingerprint impression in time, thereby ensuring the security of the user's fingerprint information.

In an example, at the above block 310, when determining the second applications that are subjected to function restrictions according to the set rule, applications excluding the first application and which are to use the fingerprint information on the terminal may be taken as the second applications. For example, if a fingerprint is used as an unlocking password of an album APP, a payment password of a shopping APP and the like, the album APP and the shopping APP may be taken as the second applications that are subjected to a function restriction.

It may be seen from the above example that other people may be prevented from opening the other applications using the fingerprint information after obtaining the fingerprint information of a user by taking the other applications that use the fingerprint information and do not include the first application on the terminal as the second applications, thereby ensuring the security of other applications.

Figure 4A:
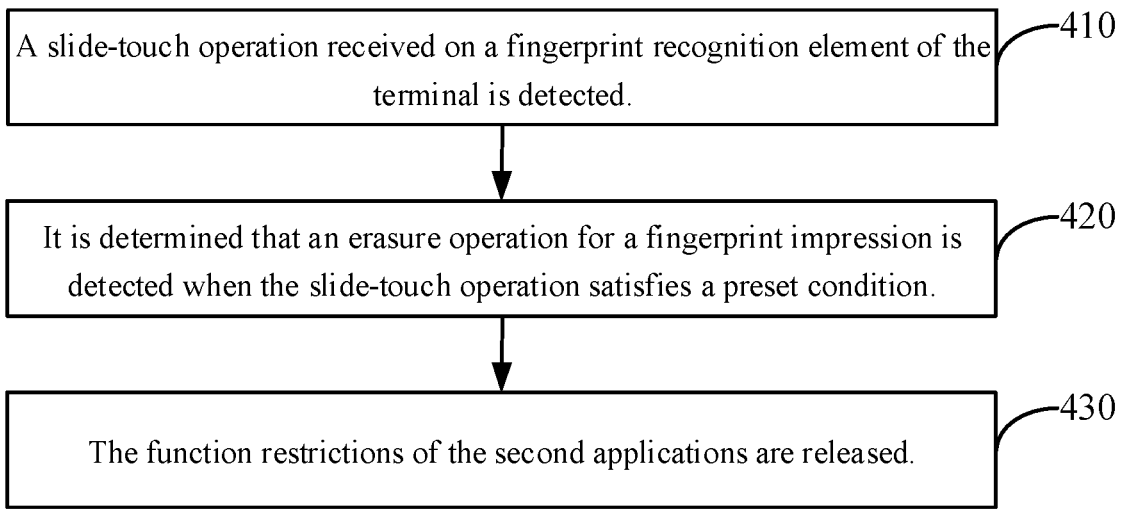
FIG. 4A is a schematic diagram illustrating an application scenario of a method of processing fingerprint information according to another example of the present disclosure.

In an example, when block 320 is executed, the following blocks 410 to 430 may be included, as shown in FIG. 4A.

At block 410, a slide-touch operation received on a fingerprint recognition element of the terminal is detected.

At block 420, it is determined that an erasure operation for a fingerprint impression is detected when the slide-touch operation satisfies a preset condition.

In the present disclosure, the slide-touch operation satisfying the preset condition may be used as the erasure operation for the fingerprint impression. After the terminal detects the erasure operation, it indicates that the user has already erased the fingerprint impression.

At block 430, the function restrictions of the one or more second applications are released.

In the above example, when the slide-touch operation received on the fingerprint recognition element of the terminal satisfies the preset condition, the terminal may determine that the erasure operation for the fingerprint impression is detected and the function restrictions of the one or more second applications are released, thereby effectively improving the reliability of processing fingerprint information.

In an example, at the above block 410, detecting the slide-touch operation received on the fingerprint recognition element of the terminal may include, for example, detecting the slide-touch operation of a user with one or more sensors. The one or more sensors may include a capacitive touch layer on the fingerprint recognition element, a pressure sensor under the fingerprint recognition element, and/or a light sensor under the fingerprint recognition element.

It may be seen from the above example that the slide-touch operation of the user may be detected by using the capacitive touch layer on the fingerprint recognition element, a pressure sensor under the fingerprint recognition element, and/or the light sensor under the fingerprint recognition element, thereby effectively improving the accuracy of detecting the slide-touch operation.

In an example, at the above block 420, whether the slide-touch operation of the user satisfies the preset condition may be determined in at least one of the following manners.

In the first manner, whether the number of repeated the slide-touch operations reaches a preset threshold is detected. When the number repeated slide-touch operations reaches the preset threshold, it may be determined that the slide-touch operation satisfies the preset condition and it may be determined that the user has already erased the fingerprint impression.

In the second manner, whether a sliding trajectory of the slide-touch operation satisfies a preset trajectory condition is detected. When the sliding trajectory of the slide-touch operation satisfies the preset trajectory condition, it may be determined that the slide-touch operation satisfies the preset condition and it may be determined that the user has already erased the fingerprint impression.

In addition, a combination of the first manner and the second manner as above may also be set, that is, when it is detected that the number of repeated slide-touch operations reaches the preset threshold and the sliding trajectory of at least one slide-touch operation satisfies the trajectory condition, it may be determined that the user has already erased the fingerprint impression.

Figure 4B:
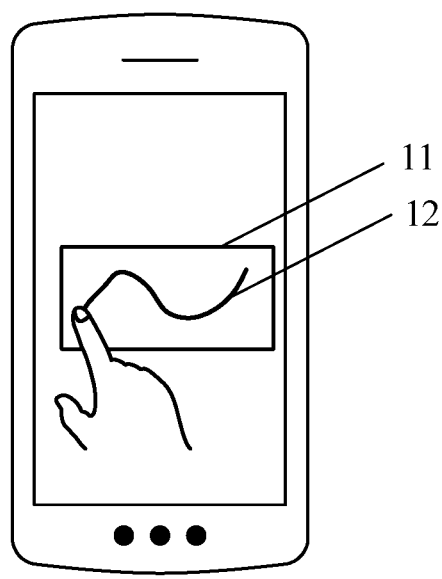
FIG. 4B is another schematic diagram illustrating a method of processing fingerprint information according to still another example of the present disclosure.

In the present disclosure, as shown in FIG. 4B, a trajectory 12 that may effectively erase a fingerprint impression is displayed in a fingerprint erasure box 11 on a terminal interface. The user may execute the slide-touch operation along this trajectory 12. The trajectory 12 may be a preset trajectory, and the preset trajectory may include, but not limited to the trajectory 12 in FIG. 4B.

It may be seen from the above example that whether the slide-touch operation satisfies the preset condition may be determined by detecting the number of repeated slide-touch operations and/or the sliding trajectory. In this way, the erasure operation for the fingerprint impression may be detected more rapidly and accurately, thereby improving the efficiency of processing fingerprint information.

Corresponding to the above examples of the method of processing fingerprint information, the present disclosure also provides an example of a device for processing fingerprint information configured to execute the above method of processing fingerprint information.

Figure 5:
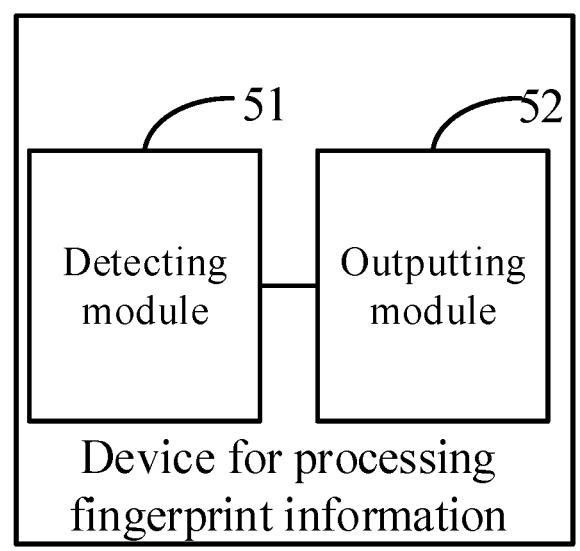
FIG. 5 is a block diagram illustrating a device for processing fingerprint information according to an example of the present disclosure.

FIG. 5 is a block diagram illustrating a device for processing fingerprint information according to an example of the present disclosure. As shown in FIG. 5, the device may be applied to a terminal and configured to execute the method of processing fingerprint information shown in FIG. 1. The device may include: a detecting module 51 and an outputting module 52.

The detecting module 51 is configured to receive fingerprint information in response to a fingerprint input operation of a user, where the fingerprint information is configured to trigger the terminal to execute a first application.

The outputting module 52 is configured to output fingerprint erasure prompt information when it is determined that the execution of the first application is finished, where the fingerprint erasure prompt information is configured to prompt the user to erase a fingerprint impression corresponding to the fingerprint information.

It may be seen from the above example that after receiving the fingerprint information in response to the fingerprint input operation of the user to trigger the terminal to execute the first application, the terminal may output the fingerprint erasure prompt information for prompting the user to erase the fingerprint impression corresponding to fingerprint information when determining that the execution of the first application is finished, so that the user may erase the fingerprint impression in time based on the fingerprint erasure prompt information, thereby avoiding the leakage of the fingerprint information and improving the security of the fingerprint information.

Figure 6:
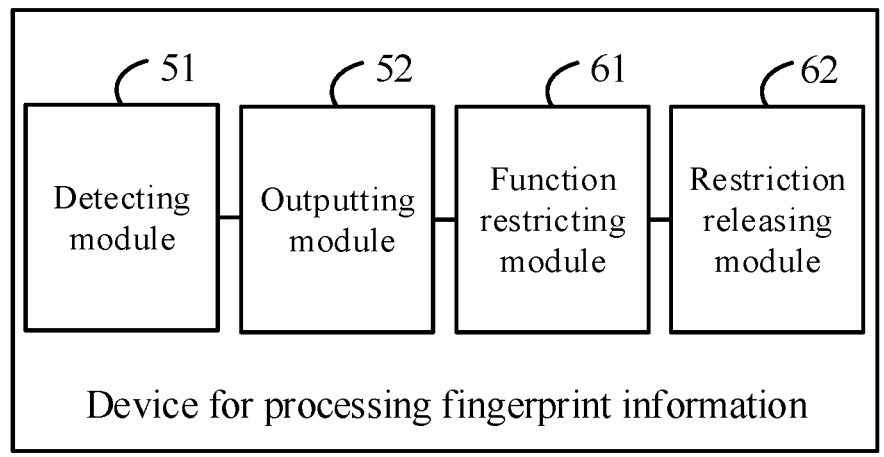
FIG. 6 is a block diagram illustrating a device for processing fingerprint information according to another example of the present disclosure.

FIG. 6 is a block diagram illustrating a device for processing fingerprint information according to another example of the present disclosure. As shown in FIG. 6, the device may be applied to a terminal. Based on the device shown in FIG. 5, the device may also include: a function restricting module 61 and a restriction releasing module 62.

The function restricting module 61 is configured to determine according to a set rule one or more second applications that are subjected to a function restriction after the first application is executed, and perform function restrictions for the one or more second applications.

The restriction releasing module 62 is configured to release the function restrictions of the one or more second applications when an erasure operation for the fingerprint impression is detected.

It may be seen from the above example that the one or more second applications that are subjected to function restrictions after the first application is executed may be determined according to the set rule and corresponding function restrictions may be performed for the one or more second applications; and the function restrictions of the second applications may be released only when the erasure operation for the fingerprint impression is detected. In this way, the user may be prompted to erase the fingerprint impression in time, thereby ensuring the security of the user's fingerprint information.

Figure 7:
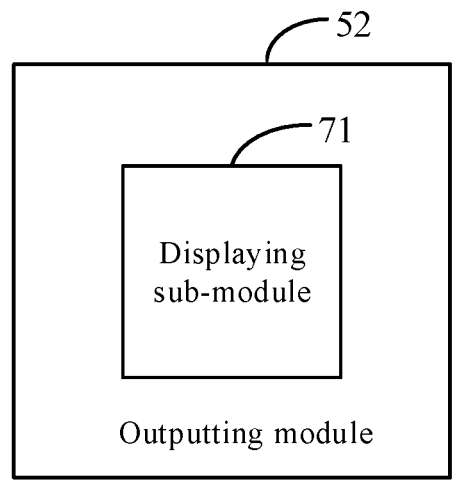
FIG. 7 is a block diagram illustrating a device for processing fingerprint information according to still another example of the present disclosure.

FIG. 7 is a block diagram illustrating a device for processing fingerprint information according to still another example of the present disclosure. As shown in FIG. 7, the device may be applied to a terminal. Based on the device shown in FIG. 5, the outputting module 52 may include: a displaying sub-module 71.

The displaying sub-module 71 is configured to display a fingerprint erasure prompt interface, where the fingerprint erasure prompt interface includes the fingerprint erasure prompt information.

It may be seen from the above example that the user may directly obtain the fingerprint erasure prompt information from the fingerprint erasure prompt interface by displaying the fingerprint erasure prompt interface including the fingerprint erasure prompt information, thereby facilitating erasure of fingerprint information.

Figure 8:
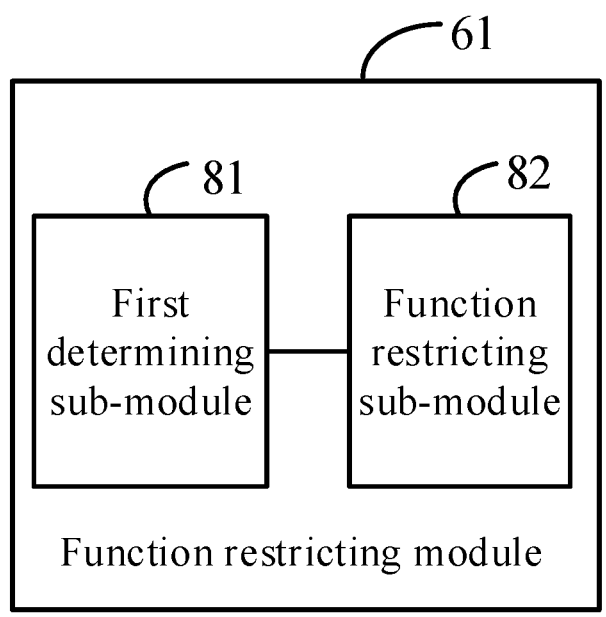
FIG. 8 is a block diagram illustrating a device for processing fingerprint information according to yet another example of the present disclosure.

FIG. 8 is a block diagram illustrating a device for processing fingerprint information according to yet another example of the present disclosure. As shown in FIG. 8, the device may be applied to a terminal. Based on the device shown in FIG. 6, the function restricting module 61 may include: a first determining sub-module 81 and a function restricting sub-module 82.

The first determining sub-module 81 is configured to take other applications that are to use the fingerprint information and exclude the first application on the terminal as the second applications.

The function restricting sub-module 82 is configured to perform function restrictions for the second applications determined by the first determining sub-module 81.

It may be seen from the above example that other people may be prevented from opening all other applications using the fingerprint information after obtaining the fingerprint information of a user by taking the other applications that use the fingerprint information and do not include the first application on the terminal as the second applications, thereby ensuring the security of other applications.

Figure 9:
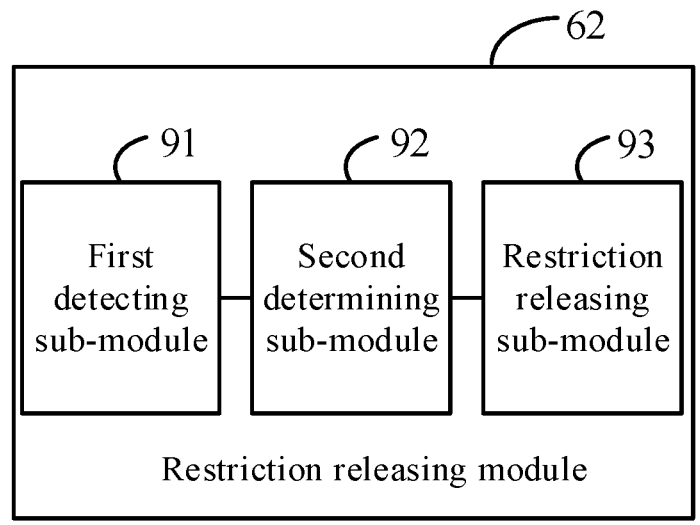
FIG. 9 is a block diagram illustrating a device for processing fingerprint information according to still another example of the present disclosure.

FIG. 9 is a block diagram illustrating a device for processing fingerprint information according to still another example of the present disclosure. As shown in FIG. 9, the device may be applied to a terminal. Based on the device shown in FIG. 6, the restriction releasing module 62 may include: a first detecting sub-module 91, a second determining sub-module 92 and a restriction releasing sub-module 93.

The first detecting sub-module 91 is configured to detect a slide-touch operation received on a fingerprint recognition element of the terminal.

The second determining sub-module 92 is configured to determine that an erasure operation for the fingerprint impression is detected when the slide-touch operation satisfies a preset condition.

The restriction releasing sub-module 93 is configured to release the function restrictions of the second applications when the erasure operation for the fingerprint impression is detected.

It may be seen from the above example that when the slide-touch operation received on the fingerprint recognition element of the terminal satisfies the preset condition, it is determined that the erasure operation for the fingerprint impression is detected and the function restrictions of the second applications may be released, thereby improving the reliability of processing fingerprint information.

Figure 10:
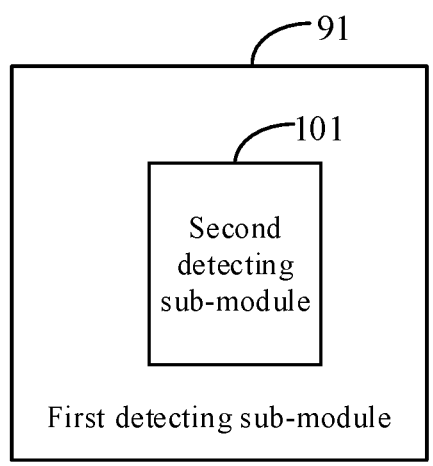
FIG. 10 is a block diagram illustrating a device for processing fingerprint information according to still another example of the present disclosure.

FIG. 10 is a block diagram illustrating a device for processing fingerprint information according to still another example of the present disclosure. As shown in FIG. 10, the device may be applied to a terminal. Based on the device shown in FIG. 9, the first detecting sub-module 91 may include: a second detecting sub-module 101.

The second detecting sub-module 101 is configured to detect the slide-touch operation by using a capacitive touch layer on the fingerprint recognition element, a pressure sensor under the fingerprint recognition element and/or a light sensor under the fingerprint recognition element.

It may be seen from the above example that the accuracy of detecting the slide-touch operation may be improved by detecting the slide-touch operation of a user with the capacitive touch layer on the fingerprint recognition element, a pressure sensor under the fingerprint recognition element and/or the light sensor under the fingerprint recognition element.

Figure 11:
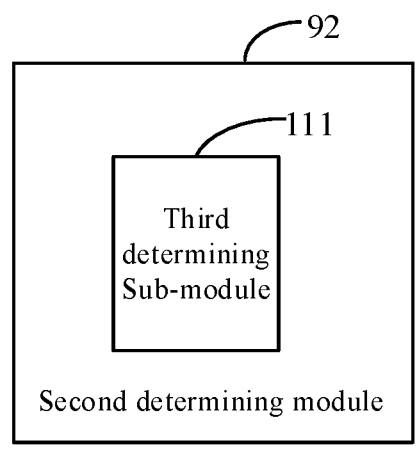
FIG. 11 is a block diagram illustrating a device for processing fingerprint information according to still another example of the present disclosure.

FIG. 11 is a block diagram illustrating a device for processing fingerprint information according to still another example of the present disclosure. As shown in FIG. 11, the device may be applied to a terminal. Based on the device shown in FIG. 9, the second determining sub-module 92 may include: a third determining sub-module 111.

The third determining sub-module 111 is configured to determine whether the slide-touch operation satisfies the preset condition in the following manners.

Whether the number of repeated slide-touch operations reaches a preset threshold is detected. When the number of repeated slide-touch operations reaches the preset threshold, it is determined that the slide-touch operation satisfies the preset condition; and/or whether a sliding trajectory of the slide-touch operation satisfies a preset trajectory condition is detected. When the sliding trajectory of the slide-touch operation satisfies the preset trajectory condition, it is determined that the slide-touch operation satisfies the preset condition.

It may be seen from the above example that whether the slide-touch operation satisfies the preset condition may be determined by detecting the number of repeated slide-touch operations and/or the sliding trajectory, so that the erasure operation for the fingerprint impression may be detected more rapidly and accurately, thereby improving the efficiency of processing fingerprint information.

The present disclosure also provides a device for processing fingerprint information. The device may be applied to a terminal. The device may include:

a processor; and a memory for storing instructions executable by the processor; where by executing the processor executable instructions, the processor is caused to:

receive fingerprint information in response to a fingerprint input operation of a user, where the fingerprint information is configured to trigger a terminal to execute a first application; and output fingerprint erasure prompt information when determining that the execution of the first application is finished, where the fingerprint erasure prompt information is configured to prompt the user to erase a fingerprint impression corresponding to the fingerprint information.

Details of the implementation process of the functions and effects of different units in the above device may be seen from the implementation process of corresponding blocks in the above method, which will not be redundantly described herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the present disclosure. Those of ordinary skill in the art may understand and carry out them without creative work.

Figure 12:
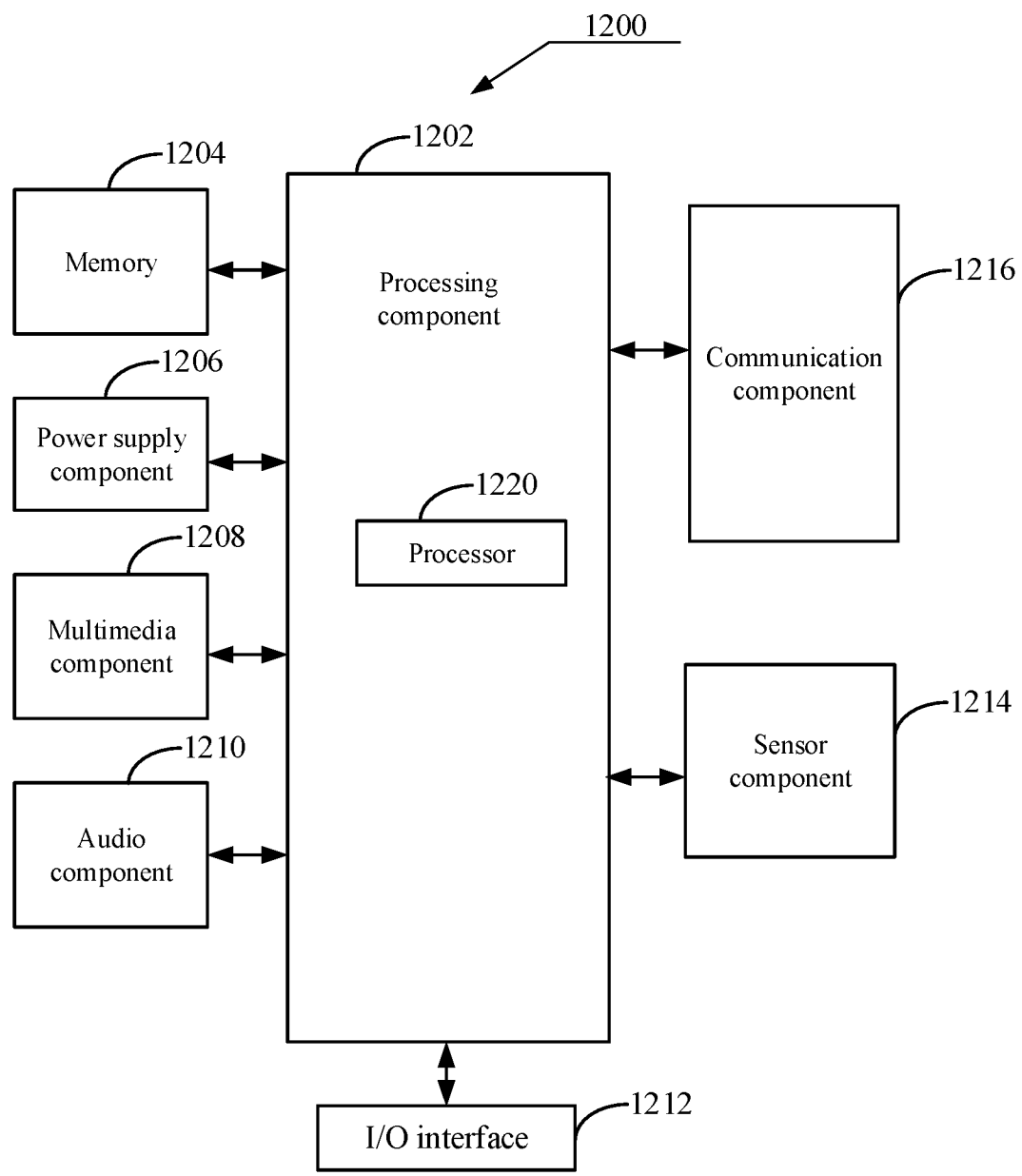
FIG. 12 is a schematic diagram illustrating a structure of a device for processing fingerprint information according to an example of the present disclosure.

FIG. 12 is a schematic diagram illustrating a structure of a device 1200 for processing fingerprint information according to an example of the present disclosure. For example, the device 1200 may be a mobile phone, a computer, a digital broadcast terminal, a message transceiving device, a game console, a tablet device, a medical device, a fitness device, a personal digital assistant with a routing function and the like.

As shown in FIG. 12, the device 1200 may include one or more of the following components: a processing component 1202, a memory 1204, a power supply component 1206, a multimedia component 1208, an audio component 1210, an input/output (I/O) interface 1212, a sensor component 1214 and a communication component 1216.

The processing component 1202 generally controls overall operations of the device 1200, such as operations related to display, a telephone call, data communication, a camera operation and a record operation. The processing component 1202 may include one or more processors 1220 for executing instructions, so as to complete all or a part of blocks of the above method. Further, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store different types of data to support operations at the device 1200. Examples of such data include instructions, contact data, phonebook data, messages, pictures, videos, and so on for any application or method that operates on the device 1200. The memory 1204 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 1206 supplies power for different components of the device 1200. The power supply component 1206 may include a power supply management system, one or more power supplies, and other components associated with generating, managing and distributing power for the device 1200.

The multimedia component 1208 includes a screen for providing an output interface between the device 1200 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touch or slide action, but also detect duration and pressure related to the touch or slide operation. In some examples, the multimedia component 1208 may include a front camera and/or a rear camera. When the device 1200 is in an operation mode, such as a shooting mode or a video mode, the front camera and/or the rear camera may receive external multimedia data. Each of the front camera and the rear camera may be a fixed optical lens system or be capable of a focal length and an optical zoom capability.

The audio component 1210 is configured to output and/or input an audio signal. For example, the audio component 1210 includes a microphone (MIC). When the device 1200 is in an operation mode, such as a call mode, a record mode and a voice recognition mode, the microphone is configured to receive an external audio signal. The received audio signal may be further stored in the memory 1204 or sent via the communication component 1216. In some examples, the audio component 1210 also includes a speaker for outputting an audio signal.

The I/O interface 1212 provides an interface between the processing component 1202 and a peripheral interface module. The peripheral interface module may be a keyboard, a click wheel, a button, or the like. These buttons may include, but are not limited to, a home button, a volume button, a start button and a lock button.

The sensor component 1214 includes one or more sensors for providing a state assessment in different aspects for the device 1200. For example, the sensor component 1214 may detect an open/closed state of the device 1200 and a relative location of components. For example, the components are a display and a keypad of the device 1200. The sensor component 1214 may also detect a position change of the device 1200 or one component of the device 1200, presence or absence of a touch of a user on the device 1200, an orientation or acceleration/deceleration of the device 1200, and a temperature change of the device 1200. The sensor component 1214 may include a proximity sensor for detecting the existence of a nearby object without any physical touch. The sensor component 1214 may also include an optical sensor, such as a CMOS or CCD image sensor used in an imaging application. In some examples, the sensor component 1214 may also include an acceleration sensor, a gyro sensor, a magnetic sensor, a pressure sensor, a microwave sensor or a temperature sensor.

The communication component 1216 is configured to facilitate wired or wireless communication between the device 1200 and other devices. The device 1200 may access a wireless network based on a communication standard, such as WiFi, 2G or 3G, or a combination thereof. In an example, the communication component 1216 receives a broadcast signal or broadcast related information from an external broadcast management system via a broadcast channel. In an example, the communication component 1216 may also include a Near Field Communication (NFC) module for promoting short range communication. For example, the NFC module may be implemented based on radio frequency identification (RFID) technology, infrared data association (IrDA) technology, ultra-wideband (UWB) technology, Bluetooth (BT) technology and other technology.

In an example, the device 1200 may be implemented by circuits including: one or more of an application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the disclosed method. Here, each module or sub-module may be at least partially implemented by the one or more circuits.

A fingerprint input operation is received, where the fingerprint input operation is used to input fingerprint information so as to trigger a terminal to execute a first application; and Fingerprint erasure prompt information is output when it is determined that the execution of the first application is finished, where the fingerprint erasure prompt information is used to prompt the user to erase a fingerprint impression corresponding to the fingerprint information.

In an example, there is also provided a non-transitory computer readable storage medium including instructions such as a memory 1204 including instructions. The instructions may be executed by the processor 1220 of the device 1200 to perform the above method. For example, the non-transitory computer readable storage medium may be a Read-Only Memory (ROM), a Random Access Memory (RAM), a CD-ROM, a magnetic tape, a floppy disk, an optical data storage device, etc.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A method of processing fingerprint information, comprising:
   receiving, by a terminal, fingerprint information in response to a fingerprint input operation of a user, wherein the fingerprint information is configured to trigger the terminal to execute a first application;
   outputting, by the terminal, fingerprint erasure prompt information when the execution of the first application is finished, wherein the fingerprint erasure prompt information is configured to prompt the user to erase a fingerprint impression corresponding to the fingerprint information;
   determining, by the terminal, one or more second applications according to a set rule, the one or more second applications being subjected to a function restriction after the execution of the first application;
   performing, by the terminal, function restrictions to the one or more second applications before an erasure operation for the fingerprint impression is detected; and
   releasing, by the terminal, the function restrictions to the one or more second applications after the erasure operation for the fingerprint impression is detected.

2. The method of claim 1, wherein outputting the fingerprint erasure prompt information comprises:
   displaying, by the terminal, a fingerprint erasure prompt interface comprising the fingerprint erasure prompt information.

3. The method of claim 1, wherein the one or more second applications comprise an application which is to use the fingerprint information and excludes the first application on the terminal.

4. The method of claim 1, wherein detecting the erasure operation for the fingerprint impression comprises:
   detecting, by the terminal, a slide-touch operation of the user on a fingerprint recognition element of the terminal; and
   determining, by the terminal, that the erasure operation for the fingerprint impression is detected when the slide-touch operation satisfies a preset condition.

5. The method of claim 4, wherein the terminal detects the slide-touch operation of the user on the fingerprint recognition element of the terminal by one or more of the following sensors:
   a capacitive touch layer on the fingerprint recognition element;
   a light sensor under the fingerprint recognition element, and
   a pressure sensor under the fingerprint recognition element.

6. The method of claim 4, wherein the preset condition comprises any one or more of the following conditions:
   a number of repeated slide-touch operations reaches a preset threshold; and
   a sliding trajectory of the slide-touch operation satisfies a preset trajectory condition.

7. A device for processing fingerprint information, the device being applied to a terminal, and comprising:
   a processor;
   a display panel controlled by the processor; and
   a memory for storing instructions executable by the processor; wherein by executing the processor executable instructions, the processor is caused to:
   receive fingerprint information in response to a fingerprint input operation of a user, wherein the fingerprint information is configured to trigger the terminal to execute a first application;
   output fingerprint erasure prompt information when the execution of the first application is finished, wherein the fingerprint erasure prompt information is configured to prompt the user to erase a fingerprint impression corresponding to the fingerprint information;
   determine one or more second applications according to a set rule, the one or more second applications being subjected to a function restriction after the execution of the first application;
   perform function restrictions to the one or more second applications before an erasure operation for the fingerprint impression is detected; and
   release the function restrictions to the one or more second applications after the erasure operation for the fingerprint impression is detected.

8. The device of claim 7, wherein when outputting the fingerprint erasure prompt information, the processor is caused to:
   control the display panel to display a fingerprint erasure prompt interface comprising the fingerprint erasure prompt information.

9. The device of claim 7, wherein the one or more second applications comprise an application which is to use the fingerprint information and excludes the first application on the terminal.

10. The device of claim 7, wherein when detecting the erasure operation for the fingerprint impression, the processor is configured to:
    detect a slide-touch operation of the user on a fingerprint recognition element of the terminal; and
    determine that the erasure operation for the fingerprint impression is detected when the slide-touch operation satisfies a preset condition.

11. The device of claim 10, wherein the processor detects the slide-touch operation of the user on the fingerprint recognition element of the terminal by one or more of the following sensors:
    a capacitive touch layer on the fingerprint recognition element;
    a light sensor under the fingerprint recognition element; and
    a pressure sensor under the fingerprint recognition element.

12. The device of claim 10, wherein the preset condition comprises any one or more of the following conditions:
    a number of repeated slide-touch operations reaches a preset threshold; and
    a sliding trajectory of the slide-touch operation satisfies a preset trajectory condition.

13. A non-transitory computer readable storage medium storing computer instructions, wherein when the instructions are executed, the processor is caused to:
    receive fingerprint information in response to a fingerprint input operation of a user, wherein the fingerprint information is configured to trigger a terminal to execute a first application;
    output fingerprint erasure prompt information when the execution of the first application is finished, wherein the fingerprint erasure prompt information is configured to prompt the user to erase a fingerprint impression corresponding to the fingerprint information;
    determine one or more second applications according to a set rule, the one or more second applications being subjected to a function restriction after the execution of the first application;
    perform function restrictions to the one or more second applications before an erasure operation for the fingerprint impression is detected; and
    release the function restrictions to the one or more second applications after the erasure operation for the fingerprint impression is detected.

14. The computer readable storage medium of claim 13, wherein when the fingerprint erasure prompt information is output, the processor is caused by executing the instructions to:
    control a display panel to display a fingerprint erasure prompt interface comprising the fingerprint erasure prompt information.

15. The computer readable storage medium of claim 13, wherein the one or more second applications comprise an application which is to use the fingerprint information and excludes the first application on the terminal.

16. The computer readable storage medium of claim 13, wherein when detecting the erasure operation for the fingerprint impression, the processor is caused by executing the instructions to:
    detect a slide-touch operation of the user on a fingerprint recognition element of the terminal; and
    determine that the erasure operation for the fingerprint impression is detected when the slide-touch operation satisfies a preset condition.

17. The computer readable storage medium of claim 16, wherein the preset condition comprises any one or more of the following conditions:

a number of repeated the slide-touch operations reaches a preset threshold; and a sliding trajectory of the slide-touch operation satisfies a preset trajectory condition.

* * * * *